Nov. 16, 1971     J. W. HARRISON     3,619,891
PIPE CLAMP
Filed May 27, 1969
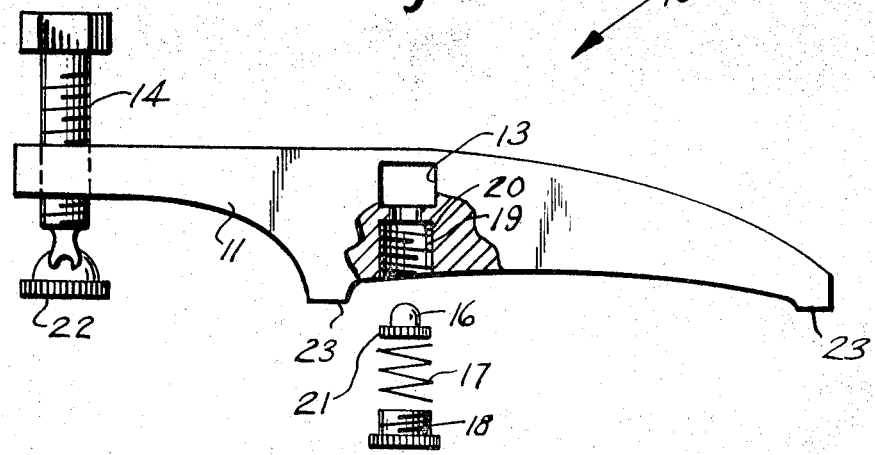
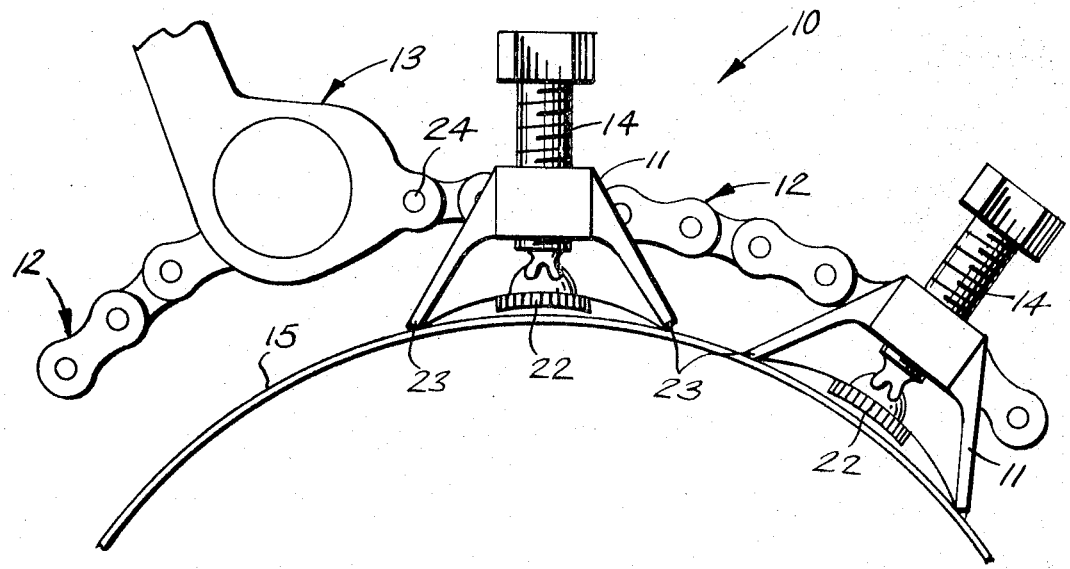
INVENTOR.
*John W. Harrison*

United States Patent Office 3,619,891
Patented Nov. 16, 1971

3,619,891
PIPE CLAMP
John William Harrison, 1362 Rose Ave., South Fort
George, British Columbia, Canada
Filed May 27, 1969, Ser. No. 828,144
Int. Cl. B25b 27/14
U.S. Cl. 29—272
2 Claims

ABSTRACT OF THE DISCLOSURE

A clamp arrangement for use in working steel pipe, the main advantage being that the device will fit all sizes of pipe. This device consists of a multiple number of aligning blocks which are slid along a roller chain held securely in place by a ratchet. The device includes a multiple number of adjusting screws which when they are slackened off will permit another pipe to abut with the pipe device placed upon it in order for them to be welded together.

---

This invention relates to tools for handling pipe, and more particularly to a pipe aligning clamp.

It is therefore the main purpose of this invention to provide an aligning pipe clamp which will consist of a plurality of spaced apart aligning block members, block members having an adjustable screw and contact foot, each of the blocks receiving a roller chain which is held in place securely by means of a ratchet.

Another object of this invention is to provide an aligning pipe clamp which will permit one pipe to abut with another in order that they may be welded together, the adjusting screws being tightened to hold the pipe together and force one to conform exactly to and flush with the periphery of the other.

A further object of this invention is to provide a clamp of the aforementioned type which will be adaptable to all sizes of pipe and will be especially suitable for working stainless steel and carbon steel pipe.

Other objects of the present invention are to provide a pipe clamp which is simple in design, inexpensive to manufacture, rugged in construction, easy to use and efficient in operation.

These and other objects will become readily evident upon a study of the following specification together with the accompanying drawing wherein:

FIG. 1 is a partially exploded side view of a clamp shown in elevation with the chain shown removed therefrom; and FIG. 2 is an end view of a pipe showing the device in use.

According to this invention, a pipe clamp 10 is shown to include a plurality of aligning blocks 11 and a roller chain 12 which is received within the rectangular openings 13 of blocks 11. Hexagonal headed adjusting screw 14 is threadingly carried within one end of aligning blocks 11 and is secured by means of ratchet 13. Pipe clamp 10 is carried on the exterior of pipe 15 and provides a means of aligning pipe 15 with a similar pipe (not shown) in order that their outer peripheries will align so that they may be welded. A flanged button member 16 is urged upwards into roller chain 12 by means of a retaining spring 17, the opposite end of retaining spring 17 abutting with an externally threaded plug 18 which is threaded into opening 19 of aligning blocks 11.

Button 16, retaining spring 17, and plug 18 are received within opening 19 of blocks 11 and the flange 21 of button 16 urges against the shoulders 20 of aligning blocks 11, the button 16 serving to render blocks 11 stationary with respect to each other along the outer periphery of pipe 15. The adjusting screws 14 of pipe clamp 10 are provided with a foot 22 which is made of a ferrous material for the purpose of preventing contamination of the pipe 15.

It shall be noted that the buttons 16 engaging roller chain 12 serve as detents within the aligning blocks 11 and aligning blocks 11 are also provided with contact points 23 which engage the periphery of pipe 15. The anchor pin 24 of ratchet pin 13 should be loose-fitting and protruding on both sides of the chain 12 and fitted with two hooks (not shown) which would be on the anchor point of the ratchet 13 for maximum efficiency.

In use, the aligning blocks 11 of clamp 10 are slid along the roller chain 12 and held securely in place by means of ratchet 13. The adjusting screws 14 are then slackened off to permit the other pipe (not shown) to abut up with pipe 15 in order to weld the two together. The adjusting screws are then tightened to hold the two pipes 15 together which will force one to conform exactly to the circumferential shape of the other.

It shall further be noted that clamp 10 can be adapted to fit all sizes of pipes which will be determined by the length of the roller chain 12 and the particular structure of pipe clamp 10 allows for the use of as many aligning blocks 11 as needed by merely placing the roller chain 12 through the openings 13 of additional aligning blocks 11, the button 16 serving as detent means for each position the particular aligning block is moved.

It shall yet further be noted that the screw foot 22 of adjustable screws 14 is of the conventional ball type so as to be adjustable to any angle for maximum efficiency of clamp 10.

What I now claim is:

1. A pipe clamp for aligning pipes, comprising in combination, a plurality of alignment blocks carried on a continuous roller chain, said chain having ratchet means for adjusting said chain length, detent means carried by said blocks for engaging said roller chain at selected positions along the length of said chain, said alignment blocks supporting adjustment screw means for aligning said pipes, portions of each block including the screw foot of said adjustment screw being of a ferrous material to prevent contamination of stainless steel pipe, a pair of spaced apart contact points on an underside of each said block for contacting the outer periphery of said pipe, one of said contact points being at one end of said block, the other said contact point being at a center of said block, said contact point positionable on a first of a plurality of pipes and said screw foot being at the other end of said block, said adjustable screw positionable on the second of a plurality of pipes providing a means of aligning one pipe with another in order that said pipes may be welded, said alignment being accomplished by the use of said ratchet on said roller chain and with the use of said adjusting screws threaded into one end of said aligning blocks.

2. The combination according to claim 1, wherein, said adjusting screws of said alignment blocks of said clamp when placed upon one pipe, are slackened off in order to permit the second pipe to abut with the first pipe carrying said pipe, after which said adjusting screws are tightened downward in order to hold said pipe together so that their circumferential shape conform to that of the other of said pipes in order to produce a good weld, each of said alignment blocks being adapted to receive said roller chain through a rectangular opening therethrough and spring-urged button means within an opening beneath said rectangular opening providing detent means for said chain to position each of said alignment blocks in an equally spaced apart relationship with each other and said button being received within the space of each length of said chain and said spring-urging one end against the flanged head of said button and urged at the other end against an externally threaded plug, said externally threaded plug being threaded into said opening receiving said button, said spring and said plug.

References Cited

UNITED STATES PATENTS

| | | | |
|---|---|---|---|
| 820,126 | 5/1906 | Phillips | 29—272 |
| 2,320,805 | 6/1943 | Smith. | |
| 2,438,541 | 3/1948 | Crook. | |
| 2,846,968 | 8/1958 | Tipton. | |

ANDREW R. JUHASZ, Primary Examiner

L. GILDEN, Assistant Examiner

U.S. Cl. X.R.

269—131; 29—200 P